US009189561B2

(12) United States Patent
Error et al.

(10) Patent No.: US 9,189,561 B2
(45) Date of Patent: Nov. 17, 2015

(54) BRIDGE EVENT ANALYTICS TOOLS AND TECHNIQUES

(75) Inventors: Christopher Reid Error, Pleasant Grove, UT (US); Brett Michael Error, Pleasant Grove, UT (US); John Pestana, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 642 days.

(21) Appl. No.: 12/028,749

(22) Filed: Feb. 8, 2008

(65) Prior Publication Data

US 2014/0244571 A1 Aug. 28, 2014

Related U.S. Application Data

(60) Provisional application No. 60/889,272, filed on Feb. 10, 2007.

(51) Int. Cl.
*G06F 7/00* (2006.01)
*G06F 17/00* (2006.01)
*G06F 17/30* (2006.01)

(52) U.S. Cl.
CPC .................................. *G06F 17/3089* (2013.01)

(58) Field of Classification Search
CPC ................................................... G06F 17/3089
USPC ................. 709/224, 229, 217, 227, 218, 200;
707/603, 999.102; 705/27, 14.54, 26,
705/14.16, 42, 80, 35, 14.1; 345/419, 581
See application file for complete search history.

(56) References Cited

U.S. PATENT DOCUMENTS

| 6,289,318 | B1* | 9/2001 | Barber | 705/14.16 |
|---|---|---|---|---|
| 7,051,029 | B1* | 5/2006 | Fayyad et al. | 1/1 |
| 8,006,187 | B1* | 8/2011 | Bailey et al. | 715/734 |
| 2002/0070953 | A1* | 6/2002 | Barg et al. | 345/700 |
| 2002/0073165 | A1* | 6/2002 | McNulty et al. | 709/217 |
| 2002/0087679 | A1* | 7/2002 | Pulley et al. | 709/224 |
| 2003/0014399 | A1* | 1/2003 | Hansen et al. | 707/3 |
| 2003/0050863 | A1* | 3/2003 | Radwin | 705/27 |
| 2003/0115333 | A1* | 6/2003 | Cohen et al. | 709/227 |
| 2004/0059746 | A1* | 3/2004 | Error et al. | 707/102 |
| 2004/0070606 | A1 | 4/2004 | Yang et al. | |
| 2004/0085345 | A1 | 5/2004 | Galou et al. | |
| 2004/0128285 | A1* | 7/2004 | Green et al. | 707/3 |
| 2005/0033803 | A1* | 2/2005 | Vleet et al. | 709/203 |
| 2006/0026071 | A1* | 2/2006 | Radwin | 705/14 |

(Continued)

OTHER PUBLICATIONS

Fenstermacher and Ginsburg, Client-Side Monitoring for Web Mining, 2003, Journal of the American Society for Information Science and Technology (JASIST), MIS department, University of Arizona, Eller College of Management, pp. 1-20.*

(Continued)

*Primary Examiner* — Taelor Kim
(74) *Attorney, Agent, or Firm* — Kilpatrick Townsend & Stockton LLP

(57) ABSTRACT

Two selected checkpoints define a group of paths represented in an analytics database. One or more events which appear between the two checkpoints on each of a plurality of the paths are identified as common bridge events. Path analysis information is then output, such as a bridge event analysis including a list of website visitor common bridge events that are ranked by their frequency of appearance, the frequencies calculated without regard to where each visitor event appears on a given path.

19 Claims, 7 Drawing Sheets

(56) References Cited

U.S. PATENT DOCUMENTS

| | | | | |
|---|---|---|---|---|
| 2006/0122917 | A1* | 6/2006 | Lokuge et al. | 705/27 |
| 2006/0253594 | A1* | 11/2006 | Szabo et al. | 709/227 |
| 2006/0277212 | A1* | 12/2006 | Error | 707/102 |
| 2007/0100992 | A1* | 5/2007 | Wong et al. | 709/224 |
| 2007/0110035 | A1* | 5/2007 | Bennett | 370/352 |
| 2009/0037579 | A1* | 2/2009 | Error et al. | 709/224 |

OTHER PUBLICATIONS

Bob Donohue, "Using Web Metrics to Estimate Impact: I—The Lawlessness of Averages", Jul. 2006.

"Web Site Traffic Reporting and Analytics", www.6smarketing.com, Dec. 12, 2006.

"Web Analytics Features", www.247canada.com, Dec. 12, 2006.

Paul Allen, "Can't Live Without Web Analytics", www.paulallen.net, Jun. 27, 2006.

"Virgin Money", www.clickstream.com, downloaded Dec. 12, 2006.

"WebTrends Web Analytics", www.inetasia.com, Dec. 15, 2006.

Avinash Kaushik, "Path Analysis: A Good Use of Time?", www.kaushik.net, May 25, 2006.

James Maguire, "How to Use Web Analytics", www.ecommerce-guide.com, Jun. 26, 2006 and Jul. 5, 2006.

Craig Scribner, "Re: Omniture Next Page Flow" in "MetricsPad: web analytics archive", www.metricspad.com, Jul. 27, 2006.

"Omniture Shatters Traditional Web Analysis Boundaries with Breakthrough Omniture Discover(TM) Tool", www.omniture.com, Jun. 8, 2005.

Omniture SiteCatalyst "Product Overview", www.omniture.com, downloaded Dec. 19, 2006.

Gary Angel et al., "HBX and SiteCatalyst: Comparative Analysis", Jun. 2006.

* cited by examiner

BRIDGE EVENT ANALYTICS TOOLS AND TECHNIQUES

RELATED APPLICATIONS

This application claims priority to, and incorporates by reference, U.S. Patent Provisional Application Ser. No. 60/889,272 filed Feb. 10, 2007.

BACKGROUND

Web site usage via browsers is regularly tracked and analyzed by commercially available web analytics services, which gather detailed data about web page usage, and to some extent about particular web site users. Entities which provide other entities with web analytics services are referred to as "analytics providers". One leading web analytics provider is Omniture, Inc., of Orem, Utah, the owner of the present invention. Omniture provides web analytics technology under its well-known mark SiteCatalyst™. All other marks used herein are property of their respective owners.

At present web analytics data are typically collected from server logs or using web-beacons. Web-beacons are small image requests placed in a web page to cause communication between the user's device and a server. The server may be controlled by the analytics provider, by the vendor whose website contains the web-beacons, or by another party. Web-beacons are also known as clear graphic interchange format images (GIFs), web bugs, image requests, or pixel tags. Web-beacons can be used for advertising, behavioral targeting, and other processes, to gather information a visits to websites. Web-beacons are commonly used by analytics providers to gather analytics data.

Web analytics data is more useful when it is presented in a manner that answers pertinent business questions. Toward that end, Omniture has provided various tools and services which filter, visualize, organize, and otherwise help manage raw analytics data in order to help Omniture clients and partners improve their web sites and services.

In particular, Omniture has commercially provided a report builder program and a compatible but separate checkpoint editor program. The user operated these programs generally as follows. The user launched the builder, and in a separate window launched the checkpoint editor. In the checkpoint editor, the user defined a plurality of checkpoints which correspond to web pages a visitor might visit in a web site. When the user had made all desired additions, deletions, or other changes to the checkpoint definitions, the user pressed a button indicating that a batch of checkpoints was ready for processing, and, in response, the report builder was run. The report builder imported the checkpoint definitions, accessed analytics data gathered about visits to the web site, created a report based on the checkpoints and the analytics data, and then displayed the report. One type of report, known as a "fallout report", shows for each checkpoint how many visitors left the path defined by the checkpoints. Fallout reporting is an example of "path analysis", the study of paths taken by web site visitors.

The user could change the checkpoints, e.g., by adding another checkpoint to the defined sequence, or by removing one of the checkpoints. In order to obtain an updated report after editing the checkpoints, the user ran the report builder again. The report builder built a new report, based on the new checkpoints and the web analytics data. This new report was built from scratch. That is, given the same checkpoints and the same analytics data (and the same report builder software), the report will be built in the same way each time regardless of any overlap between the new checkpoints for which the report is being built and any previous sequence of checkpoints. In other words, the report builder has no "memory" of its previous work, so it duplicates some report building work when some of the checkpoint pairs are unchanged.

Other concepts related to the present invention may be known, or become apparent through sources other than this background, including without limitation any references made of record in connection with the present patent application.

SUMMARY

In some embodiments, the present invention provides tools and techniques for facilitating analysis of paths that are represented in an analytics database. One such embodiment includes receiving a selection of a first checkpoint; receiving a selection of a second checkpoint; identifying a common bridge event, namely, an event which appears between the two checkpoints on each of a plurality of the paths in a position that is not necessarily adjacent to either checkpoint, and that is not adjacent to the first checkpoint on at least one of the paths; and outputting path analysis information based at least in part on the result of the identifying step.

In some embodiments, the present invention provides tools and techniques for analyzing website activity. One such embodiment includes selecting with a user interface a first checkpoint in a collection of paths represented in an analytics database; selecting a second checkpoint in the collection of paths, thereby defining a group of paths which include both the first checkpoint and the second checkpoint; and receiving a bridge event analysis including a list of at least two website visitor events found between the two checkpoints on paths in the group of paths, the visitor events each ranked in the list by frequency of appearance on paths, the frequencies calculated without regard to where each visitor event appears on a given path.

Some embodiments for path analytics include a processor and a memory which is interoperable with the processor. In some, a selection module is capable of working with the memory to select a first checkpoint in a collection of paths represented in an analytics database, and to select a second checkpoint in the collection of paths, thereby defining a group of paths which include both the first checkpoint and the second checkpoint. In some, a bridge event analysis module is capable of working with the memory to provide a bridge event analysis identifying at least two website visitor events found between the two checkpoints on paths in the group of paths, the visitor events each ranked in the list by frequency of appearance on paths, the frequencies calculated without regard to where each visitor event appears on a given path.

These examples are merely illustrative. The present invention is defined by the claims, and even though this summary helps provide a basis for the claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

FIG. 5 is a diagram illustrating a group of paths from an analytics database, including checkpoints and a common bridge event.

FIG. 6 is a diagram illustrating a group of paths from an analytics database, including checkpoints and several common bridge events.

FIG. 10 is a diagram illustrating the group of paths shown in FIG. 6 after common bridge event B2 is inserted as a new second checkpoint CP2'.

DETAILED DESCRIPTION

Introduction

Figure 1:
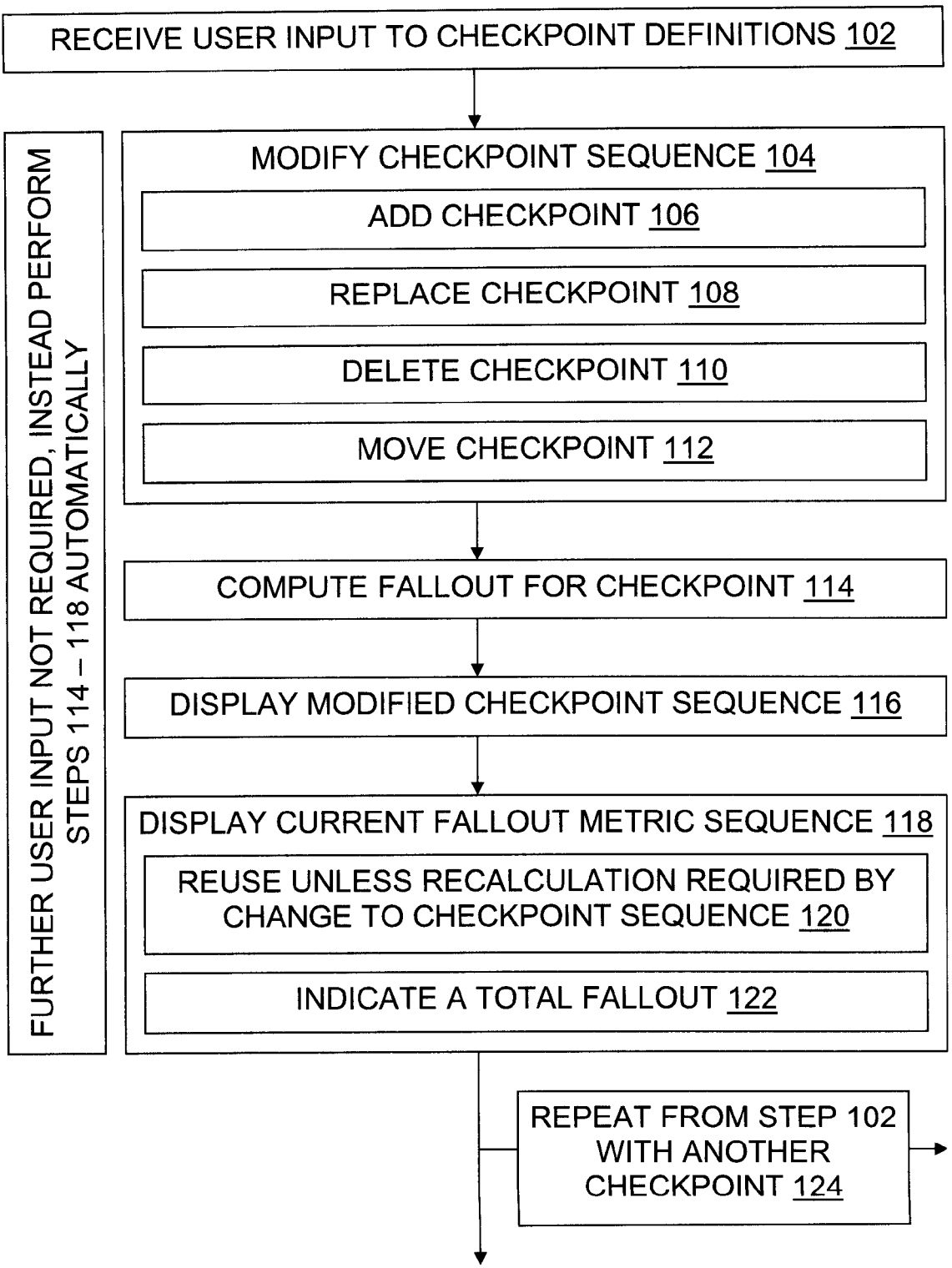
FIG. 1 is a flowchart illustrating some method embodiments for managing checkpoints and fallout metrics.

In some embodiments, the present invention provides tools and techniques for displaying information in a user interface during path analysis, including, for example, path analysis performed by an online vendor using web analytics data. Methods of the invention may also be used by other entities and/or for different purposes. Some embodiments provide tools and techniques to help manage path analysis, and in particular to help analyze fallout, conversion, and shared events along a user-defined group of paths through a large dataset, such as (but not necessarily limited to) a web analytics database which tracks visitor movements through a web site.

Some embodiments of the invention provide tools and techniques to help one understand affinity between events in a web site interaction with a visitor. The page event is one example of an event. An affinity of particular interest is the "common bridge event", namely, an event occurring somewhere in each of the bridges between specified checkpoints in a collection of paths. One could use the technology to understand any variable that an analytics provider collects into an analytics system. Affinities may be investigated, for example, in response to questions such as: What are the top search phrases that people perform on our website prior to visiting a product page? What are the top three products viewed by people who purchased a DVD player? Thus, the technology can be used to understand relationships between pages and between other things; hence, the general term "events" is used.

The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples. Likewise, although the invention arose in a web analytics context, the inventive methods, media, and systems can also be used for fallout analysis and/or common bridge event analysis with other types of data, e.g., project management data, risk mitigation data.

It is not necessary for every inventive embodiment or configuration to include every component shown in the figures or discussed in the text, or to include components in the same numbers and relationships shown here. The figures and textual descriptions are merely examples.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to be their own lexicographers, with respect to both coined terms and other terms.

For instance, "analytics" is used somewhat broadly herein. Analytics technology generates and/or gathers data about visitor behavior in websites, including in some cases web page visits, Adobe Flash® (hereinafter "Adobe Flash") or other multimedia presentation interactions, Really Simple Syndication (RSS) or other feed interactions, and/or other visitor behavior during networked presentations, in a manner similar to widely used HyperText Markup Language (HTML) web page analytics.

As an organizational tool, embodiments are discussed below first in connection with fallout analysis and then in connection with common bridge event analysis. To avoid unnecessary repetition or confusion, please also note the following. Many aspects of embodiments discussed in connection with fallout analysis can also be used in connection with common bridge event analysis, particularly aspects which involve checkpoints. Also, leaving a path or leaving a website may each be viewed as part of fallout and may also each be viewed as a potential common bridge event, so there is overlap in at least that regard between fallout analysis and common bridge event analysis. A given embodiment may provide help with fallout analysis, with common bridge event analysis, or with both.

Checkpoints, Fallout, and More

FIG. 1 illustrates some methods for managing checkpoints and fallout metrics. Although these and other inventive methods discussed herein may be performed by an analytics provider customer, they may also be performed by another entity, including without limitation by an entity which acts under the direction of, and/or for the benefit of, an analytics provider. Indeed, they may be performed by a partner of the analytics provider, for the mutual benefit of the partner and the analytics provider. When they operate on datasets other than web analytics databases, the methods may well be performed by other types of entities. Note, also, that reference is made to several Figures below, because an understanding of the inventive systems and devices will help an understanding of the methods, and vice versa.

Figure 2:
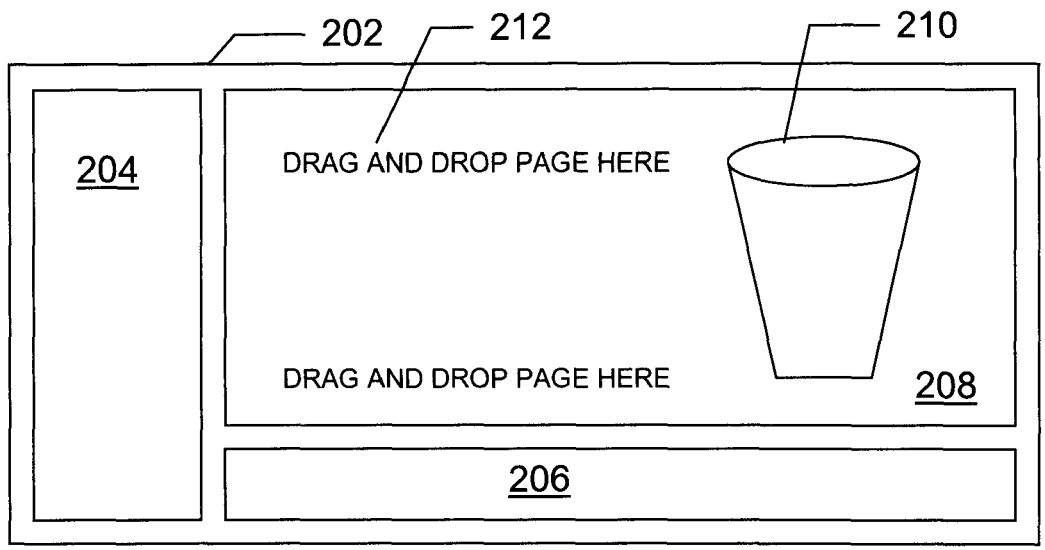
FIG. 2 is a diagram illustrating a tool interface embodiment before any checkpoint definitions have been received by the tool.
Figure 3:
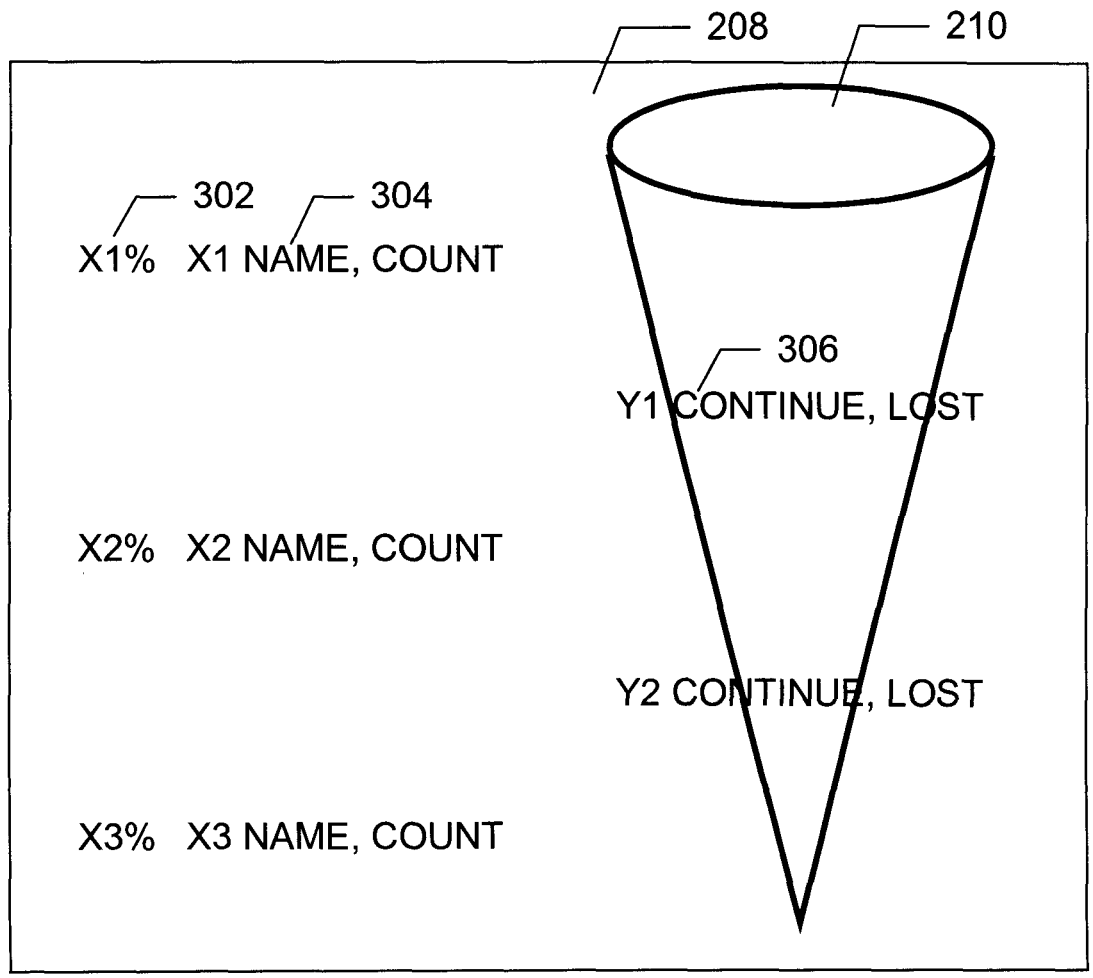
FIG. 3 is a diagram illustrating a portion of the tool interface of FIG. 2 after three checkpoint definitions have been received.

During an input receiving step 102, a user 402 provides input to a system 404 through a keyboard 408, mouse 410, network link 410, and/or other peripherals. The input provides data for use in modifying a sequence of checkpoints 422. Typically, the input will specify one or more web pages 436 whose database 432 representation is to be used as a checkpoint, and the input will specify a position (first checkpoint, second checkpoint, etc.) for that checkpoint in a sequence of checkpoints 422. In an interface like those represented in FIGS. 2 and 3, for example, the checkpoint definitions may be input 102 when a user 402 drags a web page 436 icon onto a specified screen 202 location 212 and drops it there by releasing a mouse 410 button. FIG. 2 shows an interface 208 before any checkpoint definitions 422 have been received 102, while FIG. 3 shows an interface after three checkpoint definitions 422 (represented by their page names 304) have been received 102.

Note that many steps of methods of the present invention can be viewed either from the perspective of a user 402 (end user, administrator, analyst, customer, etc.) or from the perspective of the implementation (software, hardware, etc.). Such a step can be denoted in each case by the same reference numeral (102, in this instance) regardless of the perspective. Infringement occurs, if only by equivalents, when all required actions are taken, regardless of whether one views those actions as being taken by a machine, by a person operating the machine, or some combination of the two.

The embodiment uses the received 102 input to modify 104 the current sequence of checkpoints 422. Modification updates (creates) data structures 420 in random access memory (RAM) 414, and the code updates 116 the interface display 208 accordingly, e.g., by showing 116 the checkpoint's name 304 on a screen at a location chosen by the user. The number of items (e.g., user visits to the page(s) 436 of the checkpoint) may also be displayed; this is indicated in FIG. 3 by the term "COUNT" on the screen—in an implementation using specific data, specific numbers would be displayed. The modification 104 may do one or more of the following: add 106 a new checkpoint to the sequence, replace 108 one checkpoint in the sequence with a different checkpoint (that is, overwrite it or otherwise modify its page(s) 436 definition), delete 110 a checkpoint from the sequence resulting in the sequence containing fewer checkpoints, move 112 a checkpoint to a different position within the sequence, e.g., leave its definition in terms of pages 436 unchanged but move it to a position before/after another checkpoint that it was just previously after/before.

The illustrated embodiment also computes 114 fallout for the modified sequence of checkpoints. Fallout is the number/percentage of tracked items (e.g., web page visitor paths in the analytics database 432) that do not reach the next checkpoint. Thus, fallout occurs along a path which is defined by the checkpoints. Conversion is the complement of fallout, namely, the number/percentage of tracked items that do reach the next checkpoint. The fallout number/percentage and the conversion number/percentage are some "fallout metrics". In FIG. 3, conversion is indicated by the term "CONTINUE" and fallout is indicated by "LOST"—in an implementation using specific data, specific numbers/percentages would be displayed. Some embodiments compute 114 and display 118 both fallout and conversion, while others provide only fallout, or provide only conversion, among their fallout metrics.

In some embodiments, the special case in which conversion is zero (or near enough zero, as defined by some threshold value that is either built in or user-defined) is highlighted 122 in the display. For instance, the displayed 122 metric 306 might be visually larger, bold, colored differently, flashing, and/or accompanied by a distinctive sound when conversion is zero (and hence, when fallout is total). One advantage of this, when taken in combination with the short cycle (interactive rather than batch) 124 feature noted below, is that users will no longer face a situation in which they carefully define multiple checkpoints and submit them as a batch, only to learn that total fallout occurred somewhere partway through the sequence of checkpoints they defined, thereby wasting their time and effort in defining the rest of the sequence—it is merely an empty tail end in which fallout remains total.

In operation, some embodiments of the present invention cycle 124 interactively. That is, the embodiment goes through one instance of step 102 (receiving a change to only one checkpoint), step 104 (modifying the sequence only as needed to implement the requested change to the single checkpoint that was expressly identified in the user input 102), one corresponding step 114 (calculating only the fallout change(s) made necessary by the change to that single checkpoint—other unchanged fallout metrics are reused 120), one corresponding step 116, and one corresponding step 118, before then repeating the cycle by receiving 102 additional input requesting either a change to a different checkpoint or a different change (e.g., in member pages 436) to the checkpoint. This interactive cycle 124 distinguishes such embodiments in operation from some other approaches, namely, those in which multiple checkpoint definition changes are submitted, with no fallout metric update made and/or made visible to users between submission of the respective checkpoint changes, because a batch of multiple checkpoint changes is acted on by computing fallout metrics for the entire modified sequence.

Thus, some embodiments provide a method of displaying information in a user interface during path analysis, including interactively configuring a display 208 by doing the following. In response to user input 102, modify 104 a sequence of displayed checkpoints 422, each checkpoint representing at least one point from a sequence of tracked points, the modifying step including at least one of: adding 106 a checkpoint to the sequence of displayed checkpoints, replacing 108 a checkpoint in the sequence of displayed checkpoints, deleting 110 a checkpoint from the sequence of displayed checkpoints, changing 112 the position of a checkpoint relative to another checkpoint in the sequence of displayed checkpoints. Then, without requiring further user input, automatically display 116 and 118, with the modified sequence of displayed checkpoints, a current corresponding sequence of fallout metrics 306 which reflect fallout between displayed checkpoints. In some cases, adding 106 a checkpoint uses a drag-and-drop operation to insert the added checkpoint. In some cases, replacing 108 a checkpoint uses a drag-and-drop operation to replace one checkpoint with another checkpoint. In some cases, adding 106 or replacing 108 define a checkpoint by specifying a web page 436 in a web analytics system 430, 434,404 for tracking web page visits. In some, a checkpoint 422 is defined by specifying a plurality of web pages 436 in a web analytics system for tracking web page visits, such that a visit to any of the specified web pages 436 serves as a visit to that checkpoint for the purpose of determining 114 fallout.

In some embodiments, the modified sequence of displayed checkpoints and the current corresponding sequence of fallout metrics are displayed simultaneously in a single window. In some cases, automatically displaying 118 current corresponding fallout metrics 306 includes indicating 122 in the display that fallout from one checkpoint to another checkpoint is total. In some, at least one of the following conditions holds: a current fallout metric 306 corresponding to two consecutive displayed checkpoints is displayed 118 between those checkpoints; a current fallout metric 306 corresponding to two consecutive displayed checkpoints is displayed 118 on one of those checkpoints; a current fallout metric 306 corresponding to two consecutive displayed checkpoints is displayed 118 within one fifth of the display 208 visible viewing width of at least those checkpoints; a current fallout metric 306 corresponding to two consecutive displayed checkpoints is displayed 118 within one fifth of the display's height of at least those checkpoints. In some cases, before the modifying step 104 the sequence of displayed checkpoints included at least two checkpoints and the display 208 also showed a then-current fallout metric 306 reflecting fallout from one of those checkpoints to another of those checkpoints. In some case, both a fallout value and a conversion (non-fallout) value are displayed 118 for given checkpoints.

In some embodiments, no user command is accepted 102 by the user interface between completion of checkpoint modifying 104 and completion of automatically displaying 118 a current corresponding sequence of fallout metrics. In some, no user keyboard 408 input is received 102 through the user interface between beginning the checkpoint modifying step 104 and completing the step of automatically displaying 118 a current corresponding sequence of fallout metrics. These are examples of the cycle 124 in which interactive rather than batch mode checkpoint sequence fallout metric management is done using the invention.

Some questions a user 402 might ask after specifying two checkpoints include:

1. What are the top five pages visited by people who left the path, that is, by people who hit the first checkpoint but never reached the second checkpoint?
2. What are the top five pages visited by people who stayed on the path, that is, by people who visited both checkpoints?
3. What are the top three pairs of pages visited by people who left the path, with the pages reported in the order visited (with A-B different than B-A)?
4. What are the top three pairs of pages visited by people who left the path, with the pages visited in either order (A-B and B-A both count toward visits to {A, B})?
5. What are the bottom five pages visited by people who left the path, that is, what pages did these people either completely or mostly avoid?
6. What were the minimum path length, maximum path length, and average path length, from the first checkpoint to when they left the website, taken by people who left the path?
7. What were the minimum path length, maximum path length, and average path length, for a path beginning with the first checkpoint and ending with the second checkpoint, for people who stayed on the path?

These questions help define a framework for describing a larger set of questions that users could ask. Several criteria could be used to select bridge pages and/or common bridge events in response to such questions:

N=Number of Items to Show, e.g., one could show the five most frequently visited pages (N=5), or one could show the three most frequently visited pages (N=3). This parameter makes sense only when reporting individual pages or paths, not when reporting group statistics such as min path length, max path length, or average path length of a group of paths.

L=Length of Path, e.g., with L=1 the path in question contains just one page, with L=2 we are looking at pairs of pages, with L=3 we are looking at a sequence or set of three pages, and so on. This parameter refers to the length of individually reported paths, not to group statistics such as min path length, max path length, or average path length of a group of paths.

Ordered=Yes/No; this parameter distinguishes between sequences and sets. Namely, when we are looking at paths rather than individual pages (that is, when L>1) does the order of the pages matter? If Ordered=Yes, then R-S (a visit to page R followed by a visit to page S) is a different item than S-R (visit to S followed by a visit to R). Whereas if Ordered=No, then the path R-S and the path S-R are treated as being the same.

Frequency=Most/Least, namely, are we interested in the most frequently visited pages or interested instead in the least frequently visited pages? This parameter also applies to paths having more than one page—at least in theory, one might want to see the most frequently visited pairs of pages, or the least frequently visited pairs of pages, for example.

On Checkpointed Path=Yes/No/Don't Care, namely, are we looking at pages/paths that are part of a (possibly larger) path containing both checkpoints ("Yes"), or those containing only the first checkpoint ("No"), or do we not distinguish on that basis ("Don't Care")?

Statistics=Individual Items/Group, namely, are we interested in statistics about individual pages or individual paths, on the one hand, or are we concerned instead with statistics about a group of pages or a group of paths, on the other hand? When we ask for most frequently visited pages, Statistics=Individual Items, but when we ask for average path length, Statistics=Group.

A given user, a given embodiment, and/or a given analysis may mix and match these parameters in various ways. For instance, in terms of these selection criteria, a report that shows the single page that most visitors went to after leaving a first checkpoint page has N=1 (only the single page is shown), L=1 (it's a page, not a multi-page path), Frequency=Most (it's the most popular, not the least popular), On Checkpointed Path=Don't Care, and Statistics=Individual Items. Since L=1, Ordered is not relevant.

As another example, a report showing the top five pages chosen by people who left a checkpointed path and did not come back to that path corresponds to N=5, L=1, Frequency=Most, On Checkpointed Path=No, and Statistics=Individual Items. Since L=1, Ordered is not relevant.

As another example, a report showing the top ten page pairs chosen by people who left a checkpointed path and did not come back to that path, and showing each page of a given pair in the order they were visited, corresponds to N=10, L=2, Ordered=Yes, Frequency=Most, On Checkpointed Path=No, and Statistics=Individual Items.

As another example, a report showing the longest path, shortest path, and average path length chosen by people who left a checkpointed path and did not come back to that path corresponds to Ordered=Don't Care, On Checkpointed Path=No, and Statistics=Group. N and L and Frequency are not relevant.

In short, we have a list of questions users might ask, and we have a list of parameters extracted from those questions to provide general criteria for rigorously specifying what is to be reported to the user. Page events are used in these examples, but as noted, events representing other affinities may also be measured and displayed according to the invention.

To further illustrate the concepts discussed in connection with the Figures, a web analytics example containing a specific number of checkpoints and specific visitor counts is now given. Embodiments may include features of this example, but need not necessarily include every feature of this example. The example is from an internal Omniture product requirements document, marked confidential, for the Omniture Discover 2.0™ product, entitled Fallout Report Enhanced Visualizations PRD ("PRD"), which was made part of provisional application No. 60/889,272 and thus is incorporated herein. A mock-up figure therein has the general form of FIGS. 2 and 3 herein, with some differences. Standard window icons and navigation tools such as close icons, titles, tabs, menus, scroll bars, resizing icons, and the like are depicted. Information about paths not on the checkpoint is depicted, e.g., top locations where visitors went after leaving a given checkpoint, and how many (number/percentage) went there. Cosmetic graphics, font characteristics, and coloring (including gradient color) are depicted. A left panel 204 includes a Report Menu (Customize, Bookmarks, Summary, Commerce, Traffic, Paths submenus), Segment Filter (View: Preconfigured, Advanced Filter, Loyal Visitors, Visits from Search Engine, Visits from Partner entries), and Metrics (View: Most Popular, Calculated Metrics, Orders, Page Views, Revenue entries). A bottom panel 206 includes a line graph over approximately a six week period. Panel 208 includes a background funnel graphic 210, a title "Segment: Buyers", a Page Selector entry, a title "Bookend Report", and a checkpoint sequence 422 in which five checkpoints are displayed with information 302, 304, 306. The text of the mock-up figure information is substantially smaller than normal 12 point or 14 point patent drawing text, so the information 302, 304, 306 depicted is recited below, with parenthetical comments and reference numbers.

(fallout metric 302) "100%" (checkpoint 304) "Homepage 236,562 visits"
(fallout metric 306) "9.45% continued 90.55% lost"
(fallout metric 302) "9.40%" (checkpoint 304) "Campaign 123 Landing Pages 22,349 visits"
(fallout metric 306) "44.60% continued 55.40% lost"
(fallout metric 302) "4.20%" (checkpoint 304) "http://www.apple.com/macbook/macbook.html 9,967 visits"
(fallout metric 306) "89.07% continued 10.93% lost"
(fallout metric 302) "3.80%" (checkpoint 304) "http://store.apple/com/1-800-MY-APPLE/Webobject/ . . . 8,878 visits"
(fallout metric 306) "75.55% continued 24.45% lost"
(fallout metric 302) "2.80%" (checkpoint 304) "Checkout 6,707 visits"

Some bridge page metrics, which are a form of fallout metrics measured and/or displayed by some embodiments of the present invention, are discussed and illustrated in the PRD, e.g., in PRD sections 3.2.2, 3.2.3, and 3.3, and pages 6 through 10 of the PRD.

Figure 4:
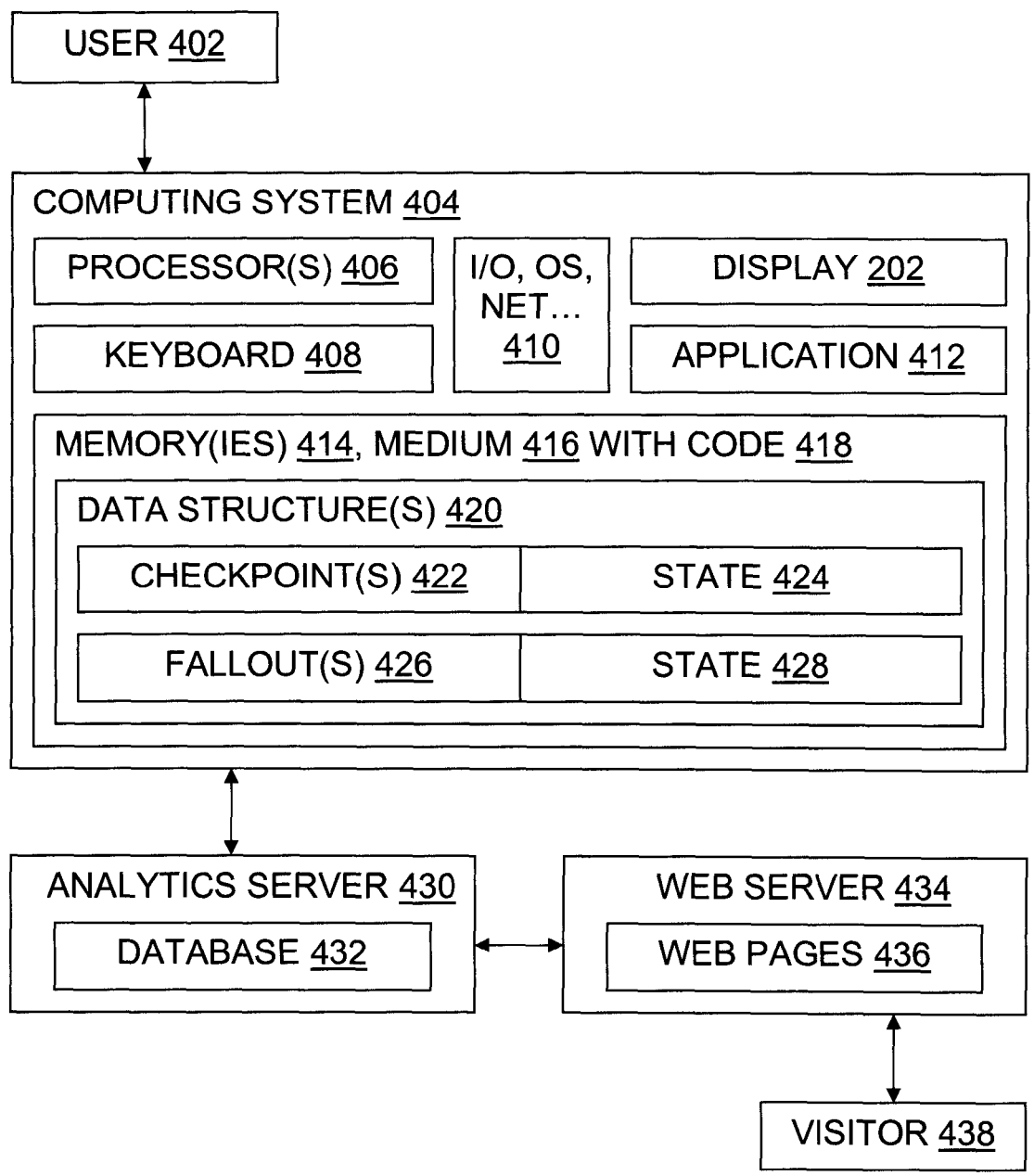
FIG. 4 is a block diagram illustrating roles, data, information and control flow, devices, methods, plug-ins, and other aspects of some system embodiments of the present invention, with particular attention to checkpoints and fallout analysis.

FIG. 4 illustrates a web analytics system according to the invention. A visitor 438 visits web pages 436 of a web site that is hosted on a web server 434. An analytics service, such as that provided by Omniture or other analytics providers, tracks visits to the web site, and gathers at least raw data (possibly also processed data) into an analytics database 432. The database is on the analytics server in the illustrated embodiment, but it could also be located elsewhere, e.g., on the same machine as the web site and/or on the same machine as the path analysis application 412 used for checkpoint sequence fallout metrics management. Likewise, the path analysis code 412 could be located on the same machine as the underlying database 432 and/or as the tracked website 436. Part or all of the path analysis code could be code 418 located on a configured medium 416 such as a compact disc (CD) or digital video disc (DVD). The servers shown could be physically separate machines, or merely separate processes running on fewer machines than there are servers shown.

The machine 404 used for fallout analysis by a user 402 will often be a computer with corresponding input/output (I/O) support 410 (keyboard 408, mouse, screen 202, speakers, trackball, touch screen, stylus, microphone, network link, etc.), path analysis software 412, other software 410 (operating system, file system, diagnostics, other applications), and other hardware (processor 406, local disk 414, etc.). But the user system 404 may include various devices that are capable of receiving web analytics information (or more generally, capable of receiving and presenting any data which is checkpointed and fallout metric managed as discussed herein), such as cell phones, mobile phones, wireless devices such as those sold under the Blackberry mark, personal digital assistants such as 25 those sold under the Palm mark, and/or other devices, including handheld devices and others. Even if the device is a computer 404, it may be part of a client-server network or it may be a peer in a peer-to-peer network, or it may be a node in some other type of network.

Figure 9:
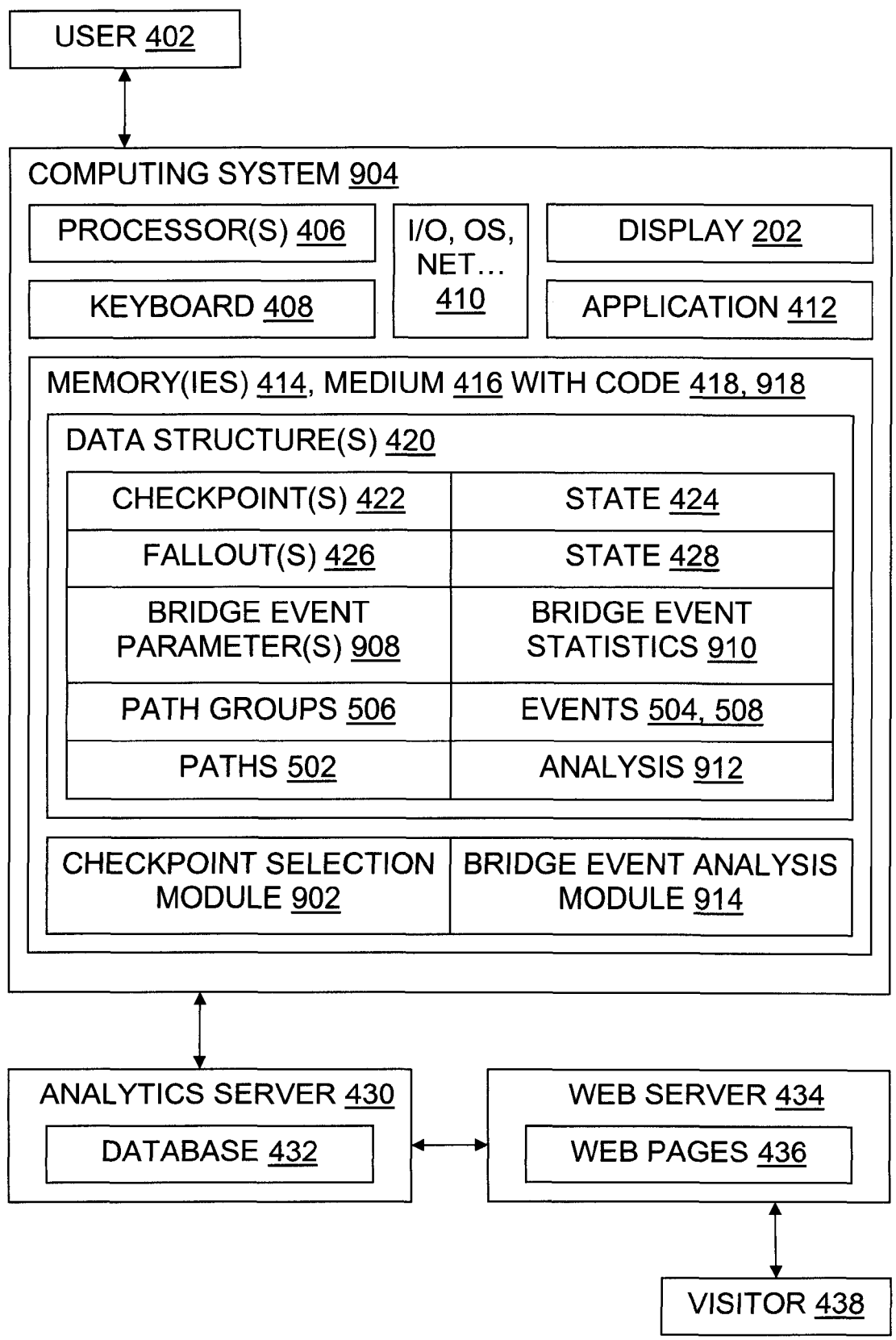
FIG. 9 is a block diagram illustrating roles, data, information and control flow, devices, methods, plug-ins, and other aspects of some system embodiments of the present invention, with particular attention to checkpoints and common bridge events.

Data structures 420 represent checkpoints 422, corresponding fallout metrics 426, and other items discussed herein; please see FIGS. 4 and 9. Familiar data structuring techniques can be used, such as records, structs, links, fields, pointers, constants, variables, arrays, lists, trees, bitflags, and so on. The visual representations 304 of checkpoints, and the visual representations 302, 306 of fallout metrics, can be distinguished from their respective data structures 422 and 426, in that the visual representations are seen by users 402 while the data structures typically are not. It will be understood, however, when implementing the invention that the data structures and their presentation to users are closely and functionally related in that the data structures 420 guide the presentation 116, 118, and the user provides 102 input for the modifying step(s) 104 based on the presentation. Thus, checkpoints may generally be referred to with any of the reference numbers 422, 424, 304, and fallout metrics may generally be referred to with reference numbers 426, 428, 302, 306. Data structure component 424 refers to state information for checkpoints, e.g., screen location 212, and whether the checkpoint has been modified 104 since the last fallout calculation 114. Data structure component 428 likewise refers to state information for fallout metrics, e.g., screen location of the presentation(s) 302 (optional), 306 (fallout and/or conversion), and whether it can be reused 120 based on recent checkpoint change(s) 104. Different implementations may use different state information, and different data structure implementations.

Some embodiments of the present invention provide a web analytics system, which includes a processor 406; a memory 414 which is interoperable with the processor; a display 202; a sequence of displayed checkpoints 304 configuring the display, each checkpoint representing at least one web page 436 in a web analytics database 432; and checkpoint sequence fallout metrics management code 418, 412 configuring the memory, the code capable of execution by the processor to modify the display by adding 106 a checkpoint to the sequence of displayed checkpoints in response to user action 102 and then automatically displaying 116, 118 without further user input a current corresponding sequence of fallout metrics 306 which reflect fallout between displayed checkpoints. In some embodiments, the sequence of displayed checkpoints 304 and the current corresponding sequence of fallout metrics 306 are displayed 116, 118 without entirely regenerating 114 the fallout metrics from raw analytics data. In some, the checkpoint sequence fallout metrics management code 418 reuses 120 a previously calculated fallout metric 426 rather than recalculating that fallout metric. In some, the display is configured by a visual indication 122 that fallout from one checkpoint to another checkpoint is total, e.g., color difference, unusual icon, flashing graphic, filled bar, slider at one end of its range, or the like. In some, a displayed fallout metric 306 includes both a fallout value and a conversion (non-fallout) value for a pair of displayed checkpoints; in others, it includes only one of those values.

Figure 7:
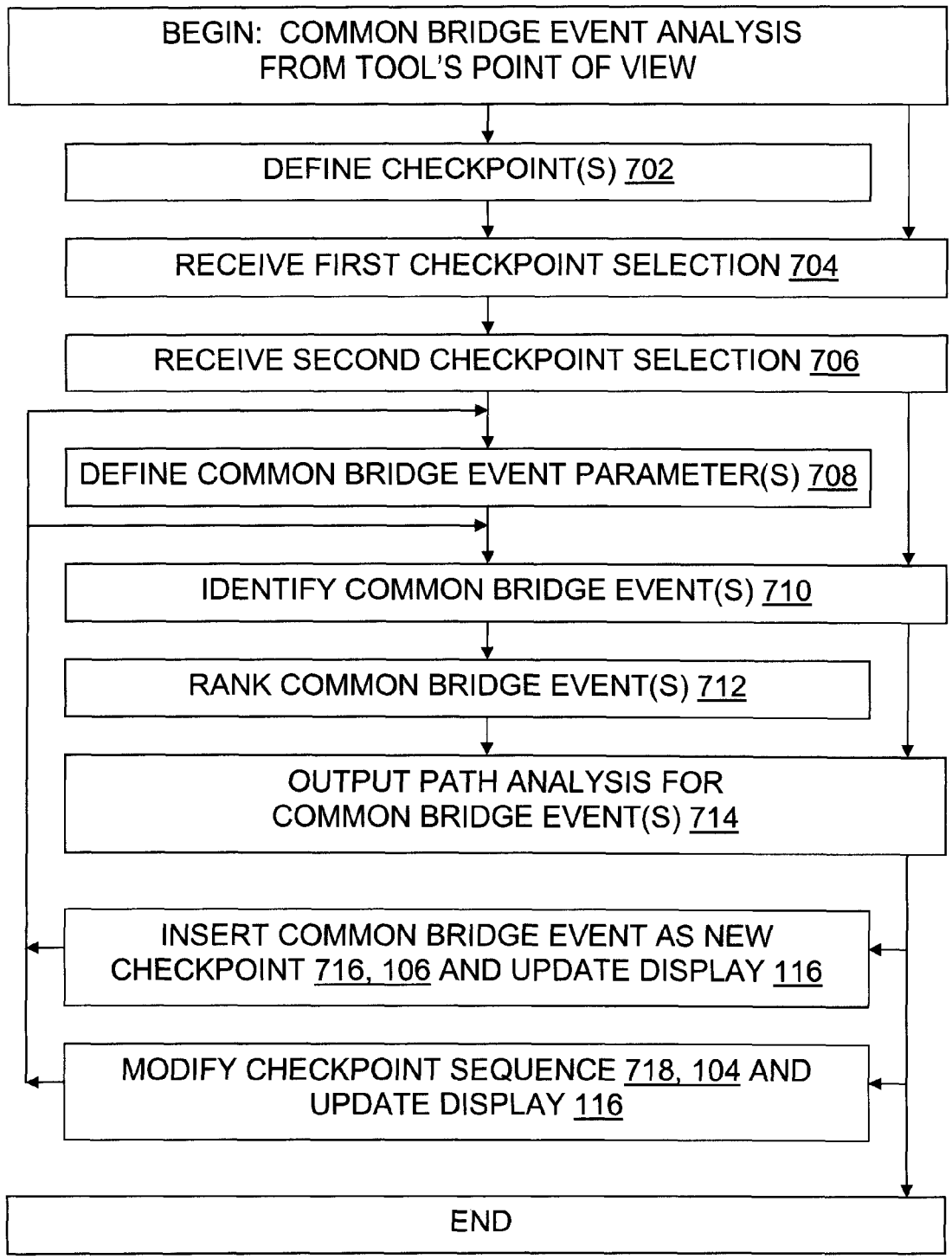
FIG. 7 is a flowchart illustrating some method embodiments for managing checkpoints and common bridge events, from a tool point of view.

Some embodiments include a computer-readable storage medium 416 such as a flash memory, CD, DVD, removable drive, or the like, which is configured to work in conjunction with a processor 406 to perform a process for checkpoint sequence fallout metric management as discussed herein, e.g., as illustrated in FIG. 1, and/or a process for common bridge event analysis, e.g., as illustrated in FIG. 7. A hard disk, RAM, tape, or other memory 414 in a device 404 or 904 may also be configured to serve as a computer-readable storage medium 416 embodying the invention. It will be understood that method embodiments and configured media embodiments are generally closely related, in the sense that many methods can be implemented using code that configures a medium, and that many configured media are configured by code 418 which performs a method. Those of skill will understand that legally equivalent methods may also be performed using hardwired special-purpose hardware which does not contain a read-only memory (ROM), programmable read-only memory (PROM), electrically erasable programmable read-only memory (EEPROM), RAM, or other memory medium embodying code 418 that performs a method like that shown in one or more of the Figures, but such implementations are expected to be unusual because of the generally high cost of implementing methods completely in silicon without a medium containing microcode or other code.

For example, some embodiments include a computer readable storage medium 416, configured with instructions 418 for performing a method of displaying information in a user interface during path analysis, the method including interactively configuring a display by: modifying 104 a sequence of displayed checkpoints in response to user action, each checkpoint representing at least one web page, and then without further user action automatically displaying with the modified sequence of displayed checkpoints 304 a current corresponding sequence of fallout metrics 306 which reflect fallout between displayed checkpoints, without entirely regenerating 120 the fallout metrics from raw analytics data. Other steps and limitations of the methods discussed herein can also be present in methods performed by configured media 416. For example, in some configured media 416 the modified sequence of displayed checkpoints and the current corresponding sequence of fallout metrics are displayed simultaneously to a user 402 in a single window of a display.

Aspects of the present invention were conceived in connection with the design of analytics provider software, specifically the Discover brand product of Omniture, Inc., but it will be understood that the invention may also be embodied in software directed at other fields of use. Some of the intended operational capabilities of the Discover brand product may be helpful in further illustrating the invention and its use, and for that reason are noted below. This discussion does not limit the invention to the particular features described, or to the presentation and management of web analytics data. Prescriptive statements apply to the contemplated product, not necessarily to the embodied invention.

A fallout report opens with a watermark 210 of a funnel (50% opacity), a blue background, and silver bars 212 where pages should be dragged and dropped 102. There should be two dashed boxes 212 with text "Drag and Drop Page Here". A page selector is open by default. The report runs when two pages are selected and added 102, 106; if only one page is added to a new report, no fallout is present so no fallout metrics 306 are reported 118. Dragging one page over another prompts the user "combine?", and users can replace 108 a checkpoint definition by adding a new page 436 to it. Thus, when pages are dragged onto each other, a highlight should appear over the existing page indicating that the new page is being added; upon release of the drag a dialog box should appear requesting that the user 402 create a page grouping 422. A name 424, 304 will be required to save the page grouping. Upon renaming, the user should save the page group. An icon of multiple stacked pages should indicate that the checkpoint is a grouping of pages 436. Dragging above or below a page should prompt the user with "add?". The report should be centered, maximized within its space, auto-expand to the best fit according to the number of checkpoints selected on a checkpoint selection dialog box, and have a default date set to the date filter applied to the loaded data set.

On report open, an active tab should read "Advanced Fallout Report". Function managers should still be viewable in the existing location, e.g., panel 204. A dynamic date filter should be present, e.g., in panel 206. A line in panel 206 denotes the time period for the report being viewed. Data should change upon either a drag of date handlebars or a zoom of the dynamic date filter.

In this proposed implementation, three objects are in a fallout report: checkpoint page, successful path, unsuccessful progression. Steps between checkpoints have two components, namely, those that moved on successfully and those who have fallen out of the process. The checkpoint page/page grouping should have an associated page name 424 or page grouping name 424, and an associated number 304 of visits and percentage 302 of total visits. A clear statement should be given of the percentage of the tracked segment 432 that moved from one checkpoint to the next. A grey box with a green arrow shows 118 the continuation 426 downward; behind and to the sides of this icon 306 is a slider that balances based on the continuation percentage and the fallout percentage. When fallout is total, this slider shows 122 at one extreme position. To each side of the slider will be a faint outwardly pointing area that shows 118 the numeric continuation and fallout percentages.

In some embodiments, on hovering over the continuation arrow, a mouse over box should appear. Statistics are given 118 in the box, including: minimum pageviews per path between the two checkpoints (find 114 lowest number of pageviews from the visitors 438 from the segment), which is the quickest way a visitor 438 progressed to the next checkpoint; average pageview per path between the two checkpoints (find 114 visitors from segment total pageviews between checkpoint and then divide 114 by visitor count); and maximum pageviews per path between the two checkpoints (find 114 highest number of pageviews from the visitors from the segment), which is the longest path on which a visitor 438 progressed to the next checkpoint.

An arrow should designate 118 that a certain percentage of those visits leaving the checkpoint fell out of the path. This arrow should lead to information 426 showing: top five site pages 436 that people left and did not come back into the path; number and percentage of visits, based upon 100% of those that did not continue in the path; all other pages visitors went to, summed for visits and percentage. Right clicking on "all others" or the all others visit metrics to show more will add five more entries each time it is selected. A red arrow icon pointing up and to the right designates 118 those who exited the site 436, with text label "Exited Site". All pages/items should show the number and percentage of visits, based upon 100% of those that did not continue in the path. Links should be given to other reports, e.g., anytime the top five exit pages out of a checkpoint are shown 118, the user 402 should be able to left click on the "all others" stat to launch a next page flow report for that particular checkpoint page 436. This will not be supported for checkpoints that are defined as a group of pages. The next page flow analysis report will open on a new analysis tab, with the checkpoint page as the starting point, the same segment, and the same date filter.

Some embodiments show most frequent events, some show least frequent, some have a predefined or user-defined limit on the minimum and/or maximum number of affinity events to show. Some show path length. Some show events on a checkpoint-defined path, e.g., page events on a path taken by a user, some show events not on such a path. Some show statistics (e.g., fallout metrics) for a specific path, some show them for a user-defined or predefined group of paths.

Some embodiments are methods performed by a user. Some are methods performed by a service provider, such as an analytics provider. Some embodiments are the product of a process, e.g., a display configured with fallout metrics. Some embodiments are systems, e.g., a computer configured with hardware for causing a processor of the computer in operable connection with memory of the computer to perform a method of measuring and/or displaying common bridge pages or other affinity/fallout metrics.

Some embodiments configure a display by showing the top N pages (1-paths) between two checkpoints, by number of visitors, N>1. Some show the top N 2-paths; some show the top N 3-paths; some show the top N M-paths, M>1. Some show the bottom N M-paths. Some show minimum path length, average path length, and/or maximum path length for paths between two checkpoints.

Checkpoints, Common Bridge Events, and More

As noted above, analysis of web analytics data may include analysis of a variety of events that are memorialized within the web analytics data. It will be understood, for example, that events of interest may include commerce events (e.g., registering, shopping cart activities, purchases), page visit events (e.g., to a specified page, or to any page within a specified group of pages), website section visit events (these may be a special case of page visit events in which the group of pages is specified as a section), product events (any action in the context of a specified product or specified product category, e.g., viewing a product), media interaction events (e.g., watching a video, interacting with an Adobe Flash® presentation, interacting with a script implemented in JavaScript, ActionScript, or another language), and avoidance events (e.g., not checking out, exiting the website). Events may be considered with or without use of customer segmentation, whether by customer profiles, campaigns, or otherwise.

In general, each action taken by a visitor to a website, and each condition satisfied by the visitor/visit at a given point in time, is susceptible to being defined as an event, if it is explicit or implicit in the analytics database memorializing the visit. A path is a sequence of events for a given visit by a given visitor, which may be an individual, a program, or another tracked entity. A checkpoint is a specified event in a path; if multiple paths are being considered, then a checkpoint may specify multiple instances of an event, or related events. A bridge event is an event on the part of a path that forms a bridge of events between two checkpoints. A common bridge event is an event (or a set or sequence of events related in a specified way) which appears on multiple paths between two specified checkpoints.

Frequent common bridge events represent popular events. Embodiments can help analysts find commonalities among the website visit experiences of different visitors. The focus here is on events that occurred to multiple visitors at some point between two navigational checkpoints, regardless of the other events that may also have been experienced by a given visitor. Some embodiments also allow refinement of the visitors' navigational context, by allowing one or more of the common bridge events found using one pair of checkpoints to be used themselves as checkpoints, allowing a user to then locate additional common bridge events for the newly defined bridges.

To help illustrate these concepts, FIG. 5 shows a group 506 of three paths 502 from an analytics database. Each path 502 includes a sequence of events 504 corresponding to actions by a website visitor. Events of particular interest in this example are designated by B; each instance of B is the same according to some definition specified, e.g., each instance of B could be "added a product to the shopping cart". Other events are designated in the Figures by E; different instances of E may correspond with very different events in the paths, e.g., one E might correspond with "visited category X landing page" while another E might correspond with "downloaded music file Y". In general, examples of events 504 (designated by B or by E) may include visiting a page, modifying a shopping cart, leaving a website, and other events familiar in web analytics.

In the configuration shown in FIG. 5, certain events/event groups have been selected for use as checkpoints 422. Each path 502 in the group 506 includes a first checkpoint, which is designated CP1 in FIG. 5, and each path also includes a second checkpoint, which is designated CP2. The common bridge event 508, designated by B, appears in this example on each of the paths 502 in the group 506 of paths that go through the specified checkpoints 422. Specifically, this example shows B appearing a total of three times on a total of three paths. To help illustrate the flexibility of some embodiments, FIG. 5 shows paths 502 of different lengths, and paths in which the bridge event is located in different positions relative to the checkpoints.

FIG. 6 shows a more complex configuration, in which multiple common bridge events appear on the paths between the two checkpoints. Specifically, a bridge event designated B1 appears a total of four times on a total of four paths; a bridge event designated B2 appears a total of two times on a total of two paths; and a bridge event designated B3 appears a total of four times on a total of three paths. As in FIG. 5, other events are not distinguished from one another but are instead designated generally by E.

FIG. 7 is a flowchart illustrating some method embodiments for managing checkpoints and common bridge events, e.g., for facilitating analysis of paths that are represented in an analytics database. Steps are shown from a tool point of view, namely, steps to be performed by a tool either automatically or with some interactive guidance, depending on the particular implementation and how it is used in a particular situation. For example, the Omniture SiteCatalyst™ tool could be modified to implement a method disclosed herein. A computer-readable medium could also be configured with code to perform such a method. Regardless, it is understood that steps performed by a tool are performed on behalf of, and/or under the control of, a legal entity such as a human person, a business, or the like.

During a checkpoint defining step 702, checkpoints are defined. This corresponds generally with one or more of steps 102 through 112 discussed above. Step 702 may be skipped if checkpoints have already been defined.

During checkpoint selection receiving steps 704 and 706, two of the checkpoints previously defined in the system are selected. Selection may be responsive to commands received via a graphic user interface or a command line interface, for example, as discussed above in connection with FIGS. 1 through 4.

During a common bridge event parameter defining step 708, parameters to filter common bridge events are defined.

Parameters may be built-in, or received interactively through an interface, for example. A common bridge event might be defined at least partially in terms of an ordered sequence of website visitor actions, such as visiting a specified page and then clicking on a specified link which also appears on other pages. A common bridge event might also be defined at least partially in terms of an unordered set of website visitor actions, such as visiting every product category main page regardless of the order in which those pages are visited.

Step 708 may be helpful when there is a significant semantic gap between events as they are defined with web bugs or the like for tracking purposes, on the one hand, and the definitions desired for identifying 710 common bridge events, on the other hand. For instance, an analytics system might track commerce events for a dozen product categories, making all the tracked events potentially common bridge events, whereas an analyst might be interested at the moment only in common bridge events which show commerce activities involving two of the product categories. Accordingly, the two product categories of interest could be defined 708 to filter out from path analysis reports any common bridge events that do not involve those two product categories.

During a common bridge event identifying step 710, the tool identifies a common bridge event, namely, an event which appears between the two checkpoints on each of a plurality of the paths in a position that is not necessarily adjacent to either checkpoint. The common bridge events identified may be, for example, one or more commerce events, visits to any of a group of specified web pages, visits to a specified website section, actions in the context of one or more specified product categories, media interaction events, and/or avoidance events. In some embodiments, the tool only identifies as potential common bridge events those events which are not adjacent to the first checkpoint on at least one of the paths; this effectively eliminates "next page" events from consideration as common bridge events. Some embodiments repeat the identifying step 710, thereby identifying at least two common bridge events.

Regardless, the events need not appear in the same relative or absolute position on each path to be identified 710 as common events; they need only appear at least once between the two selected checkpoints on each of at least two paths. In FIG. 5, for example, the same event B appears in different positions on the paths, but B appears at least once between checkpoints CP1 and CP2 on each of at least two paths, namely, on all three paths in this example. Similarly, in FIG. 6, events B1, B2, and B3 each qualify as a common bridge event, in at least some embodiments. In other embodiments, only B1 qualifies, because B2 and B3 do not appear on every path. The determination of whether an event must appear on every path, or merely need appear on more than one path, in order to be identified 710 as a common bridge event, is made by an implementer and/or by an analyst; either approach lies within the scope of contemplated embodiments.

During an optional ranking step 712, identified common bridge events are ranked according to one or more specified criteria before being displayed to the analyst. For example, events may be ranked in ascending or descending order by frequency of appearance within the paths (most frequent or least frequent), by date/time, by numeric values (units ordered, amount paid, etc.), and/or by other ranking criteria.

During an analysis outputting step 714, the tool outputs path analysis information based at least in part on the result of the identifying step 710. Output may be sent to a display screen, a file, a network connection, a formatting program, an encryption program, or elsewhere, depending on the system configuration and the analyst's preferences.

For example, a tool might display 714 in a path analysis report the top five pages identified 710 as having been visited at some point by visitors between their landing on the home page (checkpoint one) and their visiting one of the product category home pages (checkpoint two). As another example, the tool might display 714 the ten RSS feeds identified 710 as having been least downloaded by visitors between their visits to an RSS archive main page (checkpoint one) and their leaving the website (checkpoint two). Many other examples will also be apparent to those of skill.

During a common bridge event inserting step 716, an identified common bridge event is inserted between the two checkpoints and treated as a new second checkpoint. For example, FIG. 10 illustrates the group of paths shown in FIG. 6 after it has been modified by designating common bridge event B2 as a new second checkpoint CP2'. As another example, suppose CP1 was originally the event of landing on the website home page, CP2 was the event of adding an item to the shopping cart, and one of the common bridge events identified between CP1 and CP2 was viewing a video showing a product in use during a blizzard. The video viewing could then be defined as a new first checkpoint and a search could be made for the three most frequent events performed by visitors between viewing the video and adding an item to the shopping cart.

Inserting a common bridge event as a new second checkpoint may be considered a special case of adding 106 a checkpoint, as discussed above. If the checkpoint insertion 716 is in response to interaction with an analyst, then the display is updated 116 to show the insertion; if insertion 716 is automated, then the display update might not be needed.

The inserting step 716 is a special case of a step of modifying 718 a sequence of checkpoints using information from a common bridge event analysis output 714. For example, identified common bridge events could be used 104 to replace one or more checkpoints. As another example, if no common bridge events are identified 710 (that is, the set of identified common bridge events is empty) then one or both checkpoints could be moved to include more events and/or more paths in the group of paths that is defined by the selected checkpoints.

Figure 8:
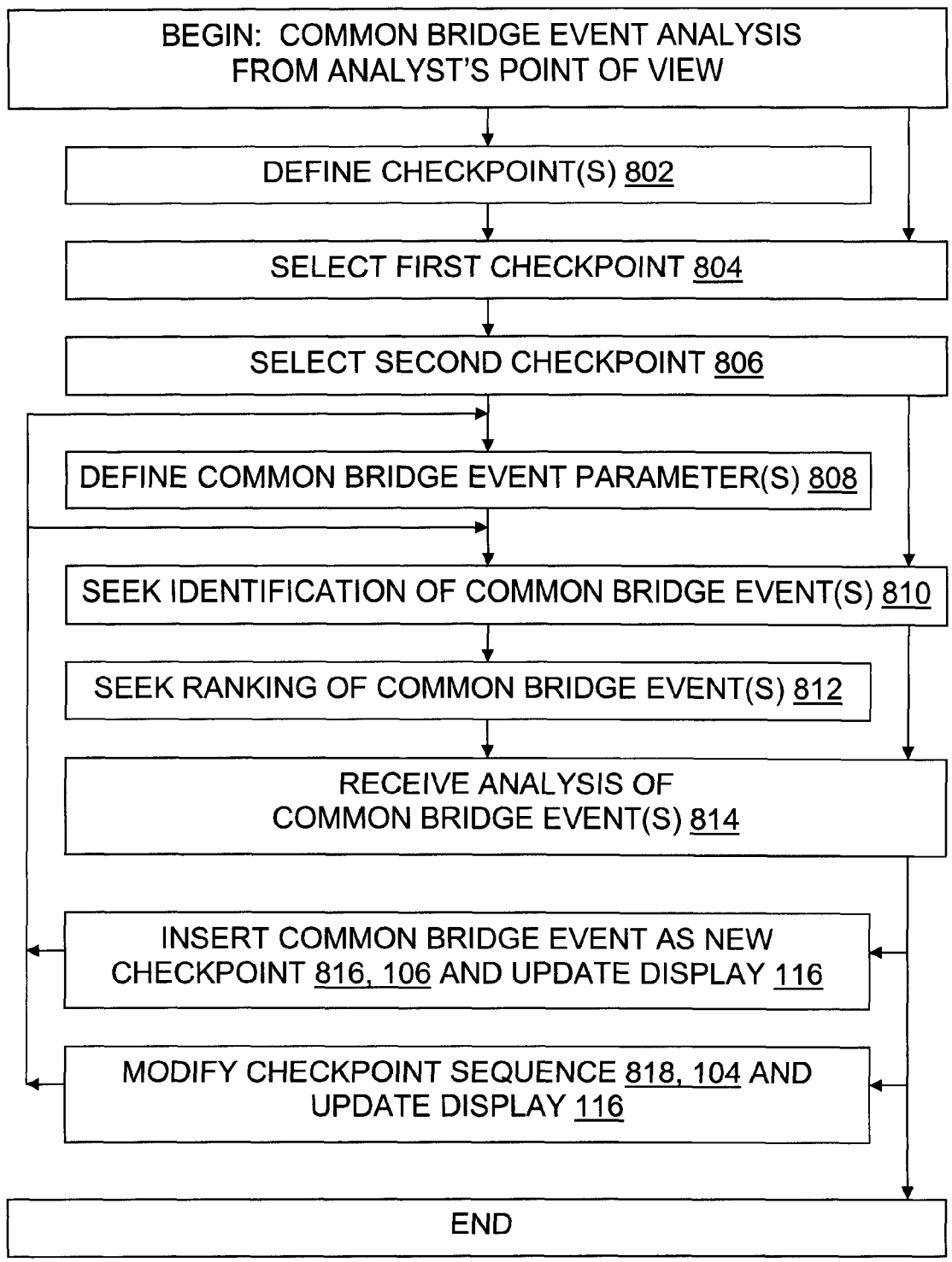
FIG. 8 is a flowchart illustrating some method embodiments for managing checkpoints and common bridge events, from a customer/analyst point of view.

FIG. 8 is a flowchart illustrating some method embodiments for managing checkpoints and common bridge events, from the point of view of a human person such as a customer, an analyst, or another user 402, or an automated process that acts on behalf of such a person. For convenience, this perspective is referred to as the analyst point of view.

During a checkpoint defining step 802, checkpoints are defined. This corresponds generally with step 702 discussed above, aside from the difference in points of view, namely, an analyst perspective versus a tool perspective.

During checkpoint selection receiving steps 804 and 806, two of the checkpoints previously defined in the system are selected. This corresponds generally with steps 704 and 706, aside from the difference in points of view.

During a common bridge event parameter defining step 808, parameters to filter common bridge events are defined. This corresponds generally with step 708, aside from the difference in points of view.

During a common bridge event identification seeking step 810, identification of common bridge events is sought, e.g., by pressing an appropriate button or otherwise entering a command. This results in tool performance of step 710.

During a ranking seeking step 812, a ranking of common bridge events is sought, e.g., by entering parameters or by relying on previously defined preferences. This results in tool performance of step 712.

During an analysis receiving step 814, the analyst receives path analysis information which was created, for example, by performing the identifying step 710 and the outputting step 714.

A common bridge event inserting step 816 and a checkpoint sequence modifying step 818 correspond generally with steps 716 and 718, respectively, aside from the difference in points of view.

Accordingly, some embodiments provide a method for analyzing website activity, including the following steps performed with a user interface: selecting 804 a first checkpoint in a collection of paths represented in an analytics database; selecting 806 a second checkpoint in the collection of paths, thereby defining a group of paths which include both the first checkpoint and the second checkpoint; and receiving 814 a bridge event analysis including a list of at least two website visitor events found between the two checkpoints on paths in the group of paths. In some embodiments, the visitor events are each ranked 712 in the received 814 list by frequency of appearance on paths, and the frequencies are calculated without regard to where each visitor event appears on a given path. For example, in some cases the bridge event analysis lists at least two most frequent bridge events, and in some cases it lists at least two least frequent bridge events. Some embodiments further include inserting 816 the bridge event between the checkpoints, thereby defining a group of paths, and then receiving 814 a bridge event analysis for events found between a previously used checkpoint and the inserted bridge event.

FIG. 9 is a block diagram illustrating roles, data, information and control flow, devices, methods, plug-ins, and other aspects of some system embodiments of the present invention, with particular attention to checkpoints and common bridge events. Many items illustrated in FIG. 9 have already been discussed above. For example, items having reference numbers in the range from 402 through 438 have been discussed at least in connection with FIG. 4. Likewise, paths 502, events in general 504, and common bridge events 508 have been discussed at least in connection with FIG. 5.

Many if not all of the items shown in FIG. 9, and hence assigned reference numbers, are also discussed herein without necessarily using the reference number in every instance. For example, bridge events are discussed in detail in connection with FIGS. 7 and 8 without the use of reference number 508 at every instance within those discussions. Similarly, bridge event parameters 908 are discussed in connection with step 708. Bridge event statistics 910 are discussed in connection with FIGS. 5, 6, and 10, and bridge event statistics 910 also include ranking as discussed in connection with step 712, and may include path length statistics. Path analyses 912 are discussed in connection with step 714.

Some embodiments include a checkpoint selection module 902 for performing checkpoint selection as discussed, for example, in connection with one or more of steps 102-112, 702-706, 716, 718, 802-806, 816, 818. In some embodiments, module 902 is capable of working with the memory 414 to select 704 a first checkpoint 422 in a collection of paths 502 represented in an analytics database 432, and to select 706 a second checkpoint 422 in the collection of paths 502, thereby defining a group 506 of paths 502 which include both the first checkpoint and the second checkpoint.

Some embodiments include a bridge event analysis module 914 for providing a bridge event analysis (a type of path analysis) as discussed, for example, in connection with one or more of steps 708-714, 808-814. In some embodiments, module 914 is capable of working with the memory 414 to provide a bridge event analysis 912 identifying 810 in a list at least two website visitor events 508 found between the two checkpoints 422 on paths 502 in the group 506 of paths, the visitor events each ranked 712 in the list by frequency of their respective appearance on the paths, the frequencies being calculated without regard to where each visitor event appears on a given path.

Modules 902 and 914 may each include software, for example. Indeed, they may be part of the path analysis software 412. Modules 902 and 914 may include software 418 in combination with a hardware memory 414 or medium 416, such as a EEPROM, RAM, ROM, hard disk, removable memory device, flash memory, CD-ROM, DVD, or the like, which is specially configured by the software. Alternately, a module 902 or a module 914 (or both) may include a special-purpose programmable array logic (PAL), application-specific integrated circuit (ASIC), field programmable gate array (FPGA), chip, or other special-purpose digital hardware component having the functionality of the software but not so easily replicated or modified as the software.

Accordingly, some embodiments provide a path analytics system 904 which includes a processor 406; a memory 414 which is interoperable with the processor 406; a selection module 902 capable of working with the memory 414 to select 704 a first checkpoint 422 in a collection of paths 502 represented in an analytics database 432, and to select 706 a second checkpoint 422 in the collection of paths 502, thereby defining a group 506 of paths which include both the first checkpoint 422 and the second checkpoint 422; and a bridge event analysis module 914 capable of working with the memory 414 to provide a bridge event analysis 912 identifying at least two website visitor events 508 found between the two checkpoints on paths in the group of paths, the visitor events each ranked in the list by frequency of appearance on paths, the frequencies calculated without regard to where each visitor event appears on a given path. For example, in some cases the bridge event analysis lists at least five most frequent bridge events, and in some cases the bridge event analysis lists at least three least frequent bridge events.

In some embodiments, the system 904 is further capable of inserting 716 a common bridge event as a new checkpoint between the first checkpoint and the second checkpoint. In some, the system 904 is further capable of providing a bridge event analysis 912 for events found between a retained checkpoint (the first checkpoint or the second checkpoint) and the inserted bridge event.

It is not necessary that every embodiment support or even recognize every possible type of event 504. For example, in some embodiments, a recognizable common bridge event 508 includes at least one of the following: a commerce event, a visit to any of a group of specified web pages, a visit to a specified website section, any action in the context of a specified product category. In some, recognizable common bridge events include a media interaction event. In some embodiments, recognizable common bridge events include avoidance events. In some, recognizable common bridge events include a sequence of website visitor actions, or an unordered set of website visitor actions.

CONCLUSION

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. Limitations from one embodiment are not necessarily read into another.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic. Any apparent inconsistencies in the text associated with a given reference number should be interpreted to broaden to meaning of that reference number.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools, including without limitation except as expressly required, JavaScript code, as well as other scripting languages, HTML, XML, APIs, SDKs, network protocol stacks, assembly language, firmware, microcode, compilers, debuggers, and/or other languages and tools.

Although this document includes at least one website address, such addresses and the material on the sites thus addressed are provided only for background and/or as examples to help illustrate the invention. This document does not incorporate by reference any essential material from such websites.

The embodiments discussed are illustrative of the application for the principles of the present invention. Numerous modifications and alternative embodiments can be devised without departing from the spirit and scope of the present invention.

We claim:

1. A non-transitory computer-readable storage medium configured with code, which when executed by a processor, causes the processor to execute a method for facilitating analysis of a plurality of paths corresponding to website visits that are represented in an analytics database, the method comprising the steps of:
providing an interface for receiving input consisting of a first selection of a first checkpoint corresponding to a first webpage visit and a second selection of a second checkpoint corresponding to a second webpage visit, wherein selection of the first checkpoint and the second checkpoint defines a selected website visitation path in which the first webpage visit is followed by the second webpage visit;
in response to receiving the input, accessing an analytics database storing a plurality of website visitation paths corresponding to representations of website visits to identify each of the website visitation paths that includes the first checkpoint followed by the second checkpoint;
in response to identifying each of the website visitation paths that includes the first checkpoint followed by the second checkpoint, analyzing the identified website visitation paths to find a first common bridge event that occurs in at least two of the identified website visitation paths and identifying a subset of the identified website visitation paths in which (i) the first common bridge event occurs between the first checkpoint and the second checkpoint in each of the identified website visitation paths of the subset and (ii) at least one other event occurs between the first checkpoint and the first common bridge event in at least one of the identified website visitation paths of the subset; and
outputting bridge event analysis information based at least in part on the subset of the identified website visitation paths, wherein the bridge event analysis information comprises an identification of the first common bridge event.

2. The configured medium of claim 1, wherein each of the identified website visitation paths of the subset includes a second common bridge event, wherein the second common bridge event comprises at least one second event that occurs between the first checkpoint and the second checkpoint.

3. The configured medium of claim 2, wherein the method further comprises ranking the first and second common bridge events according to their relative frequency within the identified website visitation paths of the subset.

4. The configured medium of claim 2, further comprising:
in response to receiving further input indicating selection of the first common bridge event as a new checkpoint, defining a modified selected website visitation path that includes the new checkpoint between the first checkpoint and the second checkpoint, and accessing the analytics database to identify each of the website visitation paths that includes the new checkpoint between the first checkpoint and the second checkpoint;
in response to identifying each of the website visitation paths that includes the new checkpoint between the first checkpoint and the second checkpoint, analyzing the identified website visitation paths to find a new common bridge event that occurs in at least two of the identified website visitation paths and identifying a new subset of the identified website visitation paths in which (i) the new common bridge event occurs between the first checkpoint and the new checkpoint in each of the identified website visitation paths of the new subset and (ii) at least one other event occurs between the first checkpoint and the new common bridge event in at least one of the identified website visitation paths of the new subset; and
outputting new bridge event analysis information based at least in part on the identified website visitation paths of the new subset, wherein the new bridge event analysis information comprises an identification of the new common bridge event.

5. The configured medium of claim 1, wherein the first common bridge event includes at least one of the following: a commerce event, a visit to any of a group of specified web pages, a visit to a specified website section, any action in the context of a specified product category, a media interaction event, or an avoidance event.

6. The configured medium of claim 1, wherein the first common bridge event is defined at least partially in terms of an ordered sequence of website visitor actions.

7. The configured medium of claim 1, wherein the first common bridge event is defined at least partially in terms of an unordered set of website visitor actions.

8. A computer-implemented method for analyzing a plurality of paths corresponding to website visits that are represented in an analytics database, the method comprising the following steps:
providing an interface for receiving input consisting of a first selection of a first checkpoint corresponding to a first webpage visit and a second selection of a second checkpoint corresponding to a second webpage visit, wherein selection of the first checkpoint and the second checkpoint defines a selected website visitation path in which the first webpage visit is followed by the second webpage visit; and in response to receiving the input, accessing an analytics database storing a plurality of website visitation paths corresponding to representations of website visits to identify each of the website visitation paths that includes the first checkpoint followed by the second checkpoint;

in response to identifying each of the website visitation paths that includes the first checkpoint followed by the second checkpoint, analyzing the identified website visitation paths to find a first common bridge event that occurs in at least two of the identified website visitation paths and identifying a subset of the identified website visitation paths in which (i) the first common bridge event occurs between the first checkpoint and the second checkpoint in each of the identified website visitation paths of the subset and (ii) at least one other event occurs between the first checkpoint and the first common bridge event in at least one of the identified website visitation paths of the subset; and outputting bridge event analysis information based at least in part on the subset of the identified website visitation paths, wherein the bridge event analysis information comprise an identification of the first common bridge event.

9. The method of claim 8, further comprising;

in response to receiving further input indicating selection of the first common bridge event as a new checkpoint, defining a modified selected website visitation path that includes the new checkpoint between the first checkpoint and the second checkpoint, and accessing the analytics database to identify each of the website visitation paths that includes the new checkpoint between the first checkpoint and the second checkpoint;

in response to identifying each of the website visitation paths that includes the new checkpoint between the first checkpoint and the second checkpoint, analyzing the identified website visitation paths to find a new common bridge event that occurs in at least two of the identified website visitation paths and identifying a new subset of the identified website visitation paths in which (i) the new common bridge event occurs between the first checkpoint and the new checkpoint in each of the identified website visitation paths of the new subset and (ii) at least one other event occurs between the first checkpoint and the new common bridge event in at least one of the identified website visitation paths of the new subset; and outputting new bridge event analysis information based at least in part on the identified website visitation paths of the new subset, wherein the new bridge event analysis information comprises an identification of the new common bridge event.

10. The method of claim 8, further comprising analyzing the subset of the identified website visitation paths to find a plurality of common bridge events occurring within each of the identified website visitation paths of the subset, and wherein the bridge event analysis information comprises identifications of at least two of the plurality of common bridge events that occur most frequently in the identified website visitation paths of the subset.

11. The method of claim 8, further comprising analyzing the subset of the identified website visitation paths to find a plurality of common bridge events occurring within each of the identified website visitation paths of the subset, and wherein the bridge event analysis information comprises indications of at least two of the plurality of common bridge events that occur least frequently in the identified website visitation paths of the subset.

12. A path analytics system for analyzing a plurality of paths corresponding to website visits that are represented in an analytics database, the system comprising:

a processor;

a memory which is interoperable with the processor, wherein the memory stores a bridge event analysis module and an analytics database storing representations of paths corresponding to website visits;

a selection interface controlled by the processor for receiving input consisting of a first selection of a first checkpoint corresponding to a first webpage visit and a second selection of a second checkpoint corresponding to a second webpage visit, wherein selection of the first checkpoint and the second checkpoint defines a selected website visitation path including the first webpage visit followed by the second webpage visit; and wherein the bridge event analysis module comprises instructions that, when retrieved from the memory and executed by the processor, implement a method comprising:

in response to receiving the input, accessing the analytics database to identify each of the website visitation paths that includes the first checkpoint followed by the second checkpoint in response to identifying each of the website visitation paths that includes the first checkpoint followed by the second checkpoint, analyzing the identified website visitation paths to find a first common bridge event that occurs in at least two of the identified website visitation paths and identifying a subset of the identified website visitation paths in which (i) the first common bridge event occurs between the first checkpoint and the second checkpoint in each of the identified website visitation paths of the subset and (ii) at least one other event occurs between the first checkpoint and the first common bridge event in at least one of the identified website visitation paths of the subset; and outputting bridge event analysis information based at least in part on the subset of the identified website visitation paths, wherein the bridge event analysis information comprises an identification of the first common bridge event.

13. The system of claim 12, wherein the selection interface is further controlled by the processor for receiving input indicating selection of the first common bridge event as a new checkpoint, for defining a modified selected website visitation path that includes the first common bridge event as a new checkpoint between the first checkpoint and the second checkpoint; and wherein the bridge event analysis module comprises further instructions for:

in response to receiving the input indicating selection of the first common bridge event as a new checkpoint, accessing the analytics database to identify each of the website visitation paths that includes the new checkpoint between the first checkpoint and the second checkpoint;

in response to identifying each of the website visitation paths that includes the new checkpoint between the first checkpoint and the second checkpoint, analyzing the identified website visitation paths to find a new common bridge event that occurs in at least two of the identified website visitation paths and identifying a new subset of the identified website visitation paths in which (i) the new common bridge event occurs between the first checkpoint and the new checkpoint in each of the identified website visitation paths of the new subset and (ii) at least one other event occurs between the first checkpoint and the new common bridge event in at least one of the identified website visitation paths of the new subset; and outputting new bridge event analysis information based at least in part on the identified website visitation paths of the new subset, wherein the new bridge event analysis information comprises an identification of the new common bridge event.

14. The system of claim 12, wherein the first common bridge event includes at least one of the following: a commerce event, a visit to any of a group of specified web pages, a visit to a specified website section, or any action in the context of a specified product category.

15. The system of claim 12, wherein the first common bridge event includes a media interaction event.

16. The system of claim 12, wherein the first common bridge event includes an avoidance event.

17. The system of claim 12, wherein the first common bridge event includes a sequence of website visitor actions.

18. The system of claim 12, wherein the bridge event analysis module comprises further instructions for analyzing the subset of the identified website visitation paths to find a plurality of common bridge events occurring within each of the identified website visitation paths of the subset, and wherein the bridge event analysis information comprises identifications of at least five of the plurality of common bridge events that occur most frequently in the identified website visitation paths of the subset.

19. The system of claim 12, wherein the bridge event analysis module comprises further instructions for analyzing the subset of the identified website visitation paths to find a plurality of common bridge events occurring within each of the identified website visitation paths of the subset, and wherein the bridge event analysis information comprises identifications of at least three of the plurality of common bridge events that occur least frequently in the identified website visitation paths of the subset.

* * * * *